(12) United States Patent
Maitland, Jr. et al.

(10) Patent No.: US 6,945,118 B2
(45) Date of Patent: Sep. 20, 2005

(54) CERAMIC ON METAL PRESSURE TRANSDUCER

(75) Inventors: William D. Maitland, Jr., Arlington, MA (US); Louis J. Panagotopulos, Walpole, MA (US); Zlatko Uvanovic, Norfolk, MA (US)

(73) Assignee: Honeywell International Inc., Morristown, NJ (US)

( * ) Notice: Subject to any disclaimer, the term of this patent is extended or adjusted under 35 U.S.C. 154(b) by 67 days.

(21) Appl. No.: 10/758,745

(22) Filed: Jan. 13, 2004

(65) Prior Publication Data

US 2005/0150303 A1 Jul. 14, 2005

(51) Int. Cl.$^7$ ............................................. G01L 9/16
(52) U.S. Cl. ........................................................ 73/754
(58) Field of Search .................. 73/715–728, 753–756, 73/706

(56) References Cited

U.S. PATENT DOCUMENTS

| | | | |
|---|---|---|---|
| 4,136,603 A | * | 1/1979 | Doyle, Jr. .................... 92/98 R |
| 4,794,048 A | | 12/1988 | Oboodi et al. ............... 428/432 |
| 4,974,117 A | | 11/1990 | Irwin .......................... 361/283 |
| 4,997,698 A | | 3/1991 | Oboodi et al. ............... 428/209 |
| 5,499,158 A | | 3/1996 | Bishop et al. ............ 361/283.4 |
| 5,525,280 A | | 6/1996 | Shukla et al. .................. 264/59 |
| 5,544,399 A | | 8/1996 | Bishop et al. .............. 29/25.41 |
| 6,091,022 A | | 7/2000 | Bodin ....................... 174/52.5 |
| 6,209,398 B1 | | 4/2001 | Fowler, Jr. et al. ............ 73/724 |
| 6,528,340 B2 | | 3/2003 | Haji-Sheikh et al. ......... 438/53 |

* cited by examiner

Primary Examiner—William Oen
(74) Attorney, Agent, or Firm—Kris T. Fredrick; Kermit D. Lopez; Luis M. Ortiz

(57) ABSTRACT

A transducer apparatus is disclosed herein, including a method thereof for forming the transducer apparatus. A metal diaphragm can be molecularly bonded to a ceramic material to form a ceramic surface thereof. A bridge circuit is connected to the ceramic surface of the metal diaphragm. An input pressure port for pressure sensing thereof can then be provided, wherein the input pressure port is connected to the metal diaphragm to thereby form a transducer apparatus comprising the metal diaphragm, the bridge circuit and the input pressure port. The metal diaphragm is preferably welded to the input pressure. The metal diaphragm and the ceramic surface thereof preferably operate over a temperature of range of at least 40° C. to 150° C., as does the transducer apparatus. The transducer apparatus functions as a pressure transducer that can be used in corrosive media and high temperature applications.

20 Claims, 1 Drawing Sheet

CERAMIC ON METAL PRESSURE TRANSDUCER

TECHNICAL FIELD

Embodiments are generally related to sensing devices and methods thereof. Embodiments are also related to pressure transducers. Embodiments are additionally related to pressure sensors. Embodiments are additionally related to ceramic-on-metal and ATF (Advanced Thick Film) processes and techniques.

BACKGROUND OF THE INVENTION

Various sensors are known in the pressure sensing arts. Pressure transducers are well known in the art. One example of a pressure transducer is a device formed with a silicon substrate and an epitaxial layer, which is grown on the substrate. A portion of the substrate can then be removed, leaving a thin, flexible diaphragm portion. Sensing components can be located in the diaphragm portion to form a pressure transducer. In operation, at least one surface of the diaphragm can be exposed to a process pressure. The diaphragm deflects according to the magnitude of the pressure, and this deflection bends the attached sensing components. Bending of the diaphragm creates a change in the resistance value of the sensing components, which can be reflected as a change in the output voltage signal of a resistive bridge formed at least partially by the sensing components.

Some techniques for forming a composite diaphragm for a pressure transducer or similar device involve configuring a substrate layer having a first conductivity type, wherein the substrate layer includes a first surface. Positive implants can then be deposited in the first surface of the substrate layer, and an epitaxial layer grown on the first surface of the substrate layer so that the positive implants form positive diffusions in the epitaxial layer. An oxide pattern can be then formed on the epitaxial layer, and a top layer deposited over the epitaxial layer and oxide pattern. The substrate layer and positive diffusions of the epitaxial layer can then be etched to form the composite diaphragm. Such a composite diaphragm can therefore be provided for use in a pressure sensor or like device. The diaphragm comprises a first layer of silicon nitride and a second layer attached to the silicon nitride layer and comprising a pressure sensor pattern of silicon material.

Pressure transducers of the type which comprise a thin, relatively flexible diaphragm portion of suitable material, such as silicon or ceramic, on which either a selected resistive element or a capacitive plate is printed whereby exposure to a pressure source causes deflection of the diaphragm will cause a change in the resistive value of the resistive element or a change in the spacing of the capacitive plate with a mating capacitive plate and concomitantly a change in capacitance are therefore well known in the art.

When used as a low pressure sensor, economical packaging of the transducer in a housing so that an effective seal is obtained while at the same time preventing stress related to the mounting and sealing of the transducer from influencing the output becomes problematic. This is caused, at least in part, by the significant difference in thermal expansion between the material used to form the transducer, e.g., silicon, ceramic or the like, and the housing of plastic or the like. A conventional sealing arrangement involves placement of a ring of sealing material around an inlet pressure port in a housing and mounting the transducer so that the pressure sensitive diaphragm is precisely aligned with the pressure port. This conventional arrangement not only involves stress isolation issues, it also limits flexibility in design choices in defining the location of the transducer within the package.

One of the major problems with such pressure transducer devices, including those that utilize diaphragm or diaphragm portion configurations, is that such devices are not reliable in corrosive and high-temperature applications. A need therefore exists for a low-cost high accuracy pressure transducer that can be used in corrosive media and high-temperature applications.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention is to provide an apparatus and a method which overcomes the above noted prior art limitations.

It another aspect of the present invention to provide an improved sensor apparatus and method.

It is an additional aspect of the present invention to provide for an improved transducer apparatus.

It is yet an additional aspect of the present invention to provide for an improved transducer apparatus, which can be formed utilizing ceramic-on-metal and ATF (Advanced Thick Film) processes and techniques.

It is a further aspect of the present invention to provide for an improved method for connecting the flex circuit to the bridge circuit.

The aforementioned aspects of the invention and other objectives and advantages can now be achieved as described herein. A transducer apparatus is disclosed herein, including a method thereof for forming the transducer apparatus. A metal diaphragm is molecularly bonded to a ceramic material to form a ceramic surface thereof. A bridge circuit is connected to the ceramic surface of the metal diaphragm. An input pressure port for pressure sensing thereof can then be provided, wherein the input pressure port is connected to the metal diaphragm to thereby form a transducer apparatus comprising the metal diaphragm, the bridge circuit and the input pressure port.

The metal diaphragm is preferably welded to the input pressure port. The metal diaphragm and the ceramic surface thereof preferably operate over a temperature of range of at least approximately −40° C. to 150° C., as does the transducer apparatus. The ceramic material is molecularly bonded to the metal diaphragm to form the ceramic surface thereof. The ceramic surface bonded to the metal diaphragm can also be configured as a ceramic substrate. The ceramic surface provides corrosion protection to the metal diaphragm. The bridge circuit generally comprises a resistor network and provides an output proportional to the applied force. A flex circuit comprising an ASIC (Application Specific Integrated Circuit), associated circuitry and EMI protection provides signal conditioning, calibration and compensation. A snap on connector system comprising a plastic snap on lead frame and Z axis conductor material can be utilized for connecting the flex circuit to the bridge network which is located on the diaphragm.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
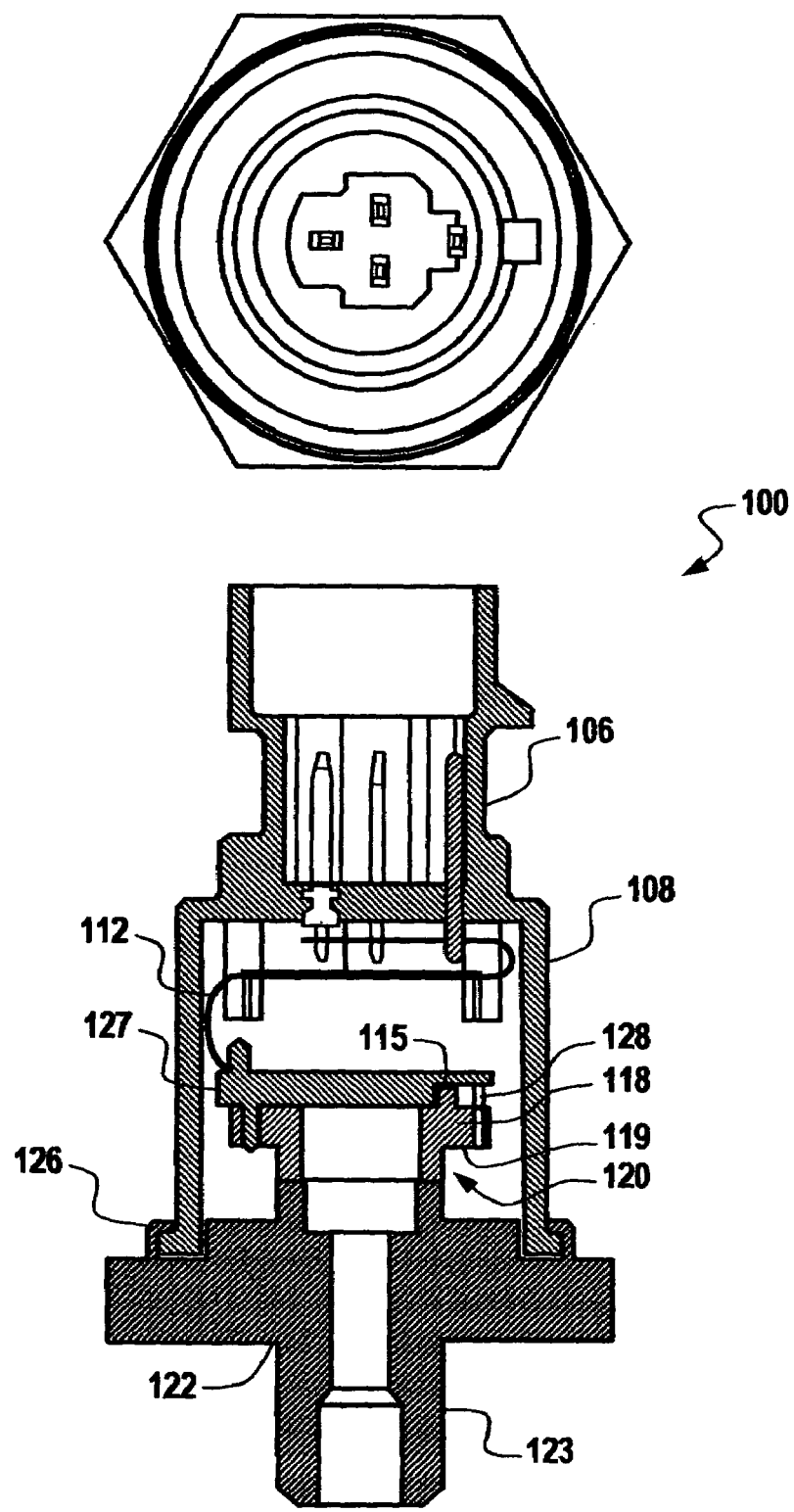
FIG. 1 illustrates a top and side-sectional view of a transducer apparatus, which can be implemented in accordance with a preferred embodiment of the present invention.

The particular values and configurations discussed in these non-limiting examples can be varied and are cited merely to illustrate at least one embodiment of the present invention and are not intended to limit the scope of the invention.

FIG. 1 illustrates a side-sectional view a transducer apparatus 100, which can be implemented in accordance with a preferred embodiment of the present invention. Transducer apparatus generally includes a metal diaphragm 119 which is molecularly bonded to a ceramic material or ceramic substrate 118. A bridge circuit 115 comprising a resistor network can be bonded to the ceramic substrate 118, which is formed on the metal diaphragm 119. A flex circuit 112 comprises an ASIC, EMI protection and associated circuit components. The ceramic substrate 118 is bonded to the metal diaphragm and provides corrosion protection to the metal diaphragm 119.

The flex strip 112 connects the bridge circuit 115 to a case or housing 108 (e.g., a cover) and a connector portion 106. The flex circuit can be electrically and mechanically attached to the bridge circuit by catching the flex circuit 112 and z-axis conductor 128 with a plastic lead frame 127 which snaps around the and holds the z axis conductor and flex circuit in place. The components can be aligned such that the conductor path is from the bridge circuit, through the z axis conductor into the flex circuit. Such an assembly method and configuration can therefore eliminate the need for soldering and wire bonding.

An input pressure port 122 can be provided for pressure sensing thereof, such that the input pressure port is welded to the metal diaphragm 119 to thereby form the transducer apparatus 100 comprising the metal diaphragm, the ceramic substrate the bridge circuit and the input pressure port. FIG. 1 additionally illustrates welded joint between the pressure port 122 and diaphragm 119. A threaded portion 123 is also depicted in FIG. 1, along with a crimp edge 126, and a connector portion 106. A case or housing 108 surrounds the aforementioned internal components of transducer apparatus 100. Housing 108 can be formed from a suitable material such as plastic a light-weight and non-conducting material. Note that more that one pressure port 122 or connector 106 may be embodied with transducer apparatus 100.

Transducer apparatus 100 solves the need for a low-cost and high-accuracy pressure transducer that can be utilized in corrosive media and high-temperature applications. Transducer apparatus 100 can be formed via a ceramic-on-metal technology adapted for use as a pressure sensor design that can be constructed at a low-cost. Processes that are utilized for the formation transducer apparatus 100 include molecular bonding of ceramic to a metal diaphragm, such as, for example, metal diaphragm 119, followed thereafter by welding of the metal diaphragm (i.e., metal diaphragm sensor) to the input pressure port. The ceramic-on-metal design provides high-accuracy and stability over an operating temperature range of approximately 40° C. to 150° C.

Ceramic material can be molecularly bonded to the metal diaphragm utilizing an ATF (Advanced Thick Film) process. The metal diaphragm is therefore formed as a ceramic coated article having a metal core (i.e., the metal of the metal diaphragm) and having on at least a portion of the surface of the metal core a coating of a ceramic. The ceramic can be, for example, a glass ceramic, but the use of glass ceramics is not considered a limiting feature of the present invention. Glass ceramic is presented herein only as an example in which the invention can be embodied via the ATF process.

A glass ceramic coating can be based on its oxide content and on the total weight of the coating, comprising, for example, (a) from about 8 to about 26% by weight of magnesium oxide (MgO); (b) from about 10 to about 49% by weight of aluminum oxide ($Al_2O_3$); and (c) from about 42 to about 68% by weight of silicon oxide ($SiO_2$). Ceramic/glasses adapted for use with the transducer apparatus 100 described herein, generally possess high temperature re-firing capabilities (e.g., 850° C.), and are air fireable. Moreover, ceramic coated article can exhibit a composite thermal coefficient of expansion which is optimum for use in electronic devices, and which can exhibit a low dielectric constant which allows for use with high frequency circuits and allows for greater applicability in electronic application.

Furthermore, the ceramic/glasses utilized via the ATF process thereof can exhibit strong adhesion to the metal substrate after firing and are very resistant to thermal stress. This avoids breakdown of the devices formed from the ceramic coated article of this invention when such articles are exposed to high temperatures normally encountered in the operation of electronic devices. This resistance to thermal stress is indeed surprising in view of the relatively large difference in the thermal coefficient of expansion of the metal substrate and the ceramic glass, and the prior teachings that the metal and coating coefficients of expansion must be matched to produce good adhesion.

The glass/ceramic coated article thus generally comprises a metal core and possesses on at least a portion of the surface of the metal core a coating of a glass ceramic. A general example of the ATF involves: (a) heating a metal substrate in the presence of oxygen at a first temperature for a time sufficient to form any amount of an oxide layer on the surfaces of the substrate; and (b) applying to all or a portion of the surfaces of the substrate a suspension comprising one or more organic solvents, one or more heat degradable polymeric binders and a calcined mixture of finely divided non-conductive materials comprising (i) from about 8 to about 26% by weight of MgO; (ii) from about 10 to about 49% by weight of $Al_2O_2$ and (iii) from about 42 to about 68% by weight of $SiO_2$.

Such an ATF process additionally can include (c) heating the coated/metal substrate combination of step (b) at a second temperature for a time sufficient to remove substantially all of the solvents from the applied suspension; and (d) heating the coated/metal substrate combination of step (c) at a third temperature for a time sufficient to degrade substantially all of the binders in the applied suspension; (e) heating the coated/metal substrate combination of step (d) at a fourth temperature for a time sufficient to sinter the non-conductive material to form a device comprising a metal substrate having a predetermined pattern of glass/ceramic material bonded to one or more surfaces thereof.

The material can generally comprise (on an oxide basis): (i) from about 8 to about 26% by weight of MgO; (ii) from about 10 to about 49% by weight of $Al_2O_3$; and (iii) from about 42 to about 68% by weight of $SiO_2$; (f) heat treating the device at a fifth temperature for a time sufficient to re-crystallize any residual glass contained in the material to any extent.

The ATF process provides for greater selectivity in the application of the glass/ceramic materials to specific sites on a substrate which provides for greater freedom in the manufacture of devices such as the transducer apparatus 100. After processing, in accordance with embodiments disclosed herein, the coating can contain crystallized glass/ceramic, which strongly adheres to the metal core and can be suitable as a substrate for processed induced components. An example of an ATF process is disclosed in U.S. Pat. No. 4,794,048 entitled, "Ceramic Coated Metal Substrates for Electronic Applications," which issued to Oboodi et al on Dec. 28, 1988, and which is incorporated herein by reference. Another example of an ATF process is disclosed in U.S. Pat. No. 4,997,698 entitled "Ceramic Coated Metal Substrates for Electronic Applications," which issued to Oboodi et al on Mar. 5, 1991, and which is incorporated herein by reference.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A transducer apparatus, comprising:
    a metal diaphragm molecularly bonded to a ceramic material to form a ceramic surface thereof;
    a bridge circuit connected to said ceramic surface of said metal diaphragm;
    an input pressure port for pressure sensing thereof, wherein said input pressure port is connected to said metal diaphragm to thereby form a transducer apparatus comprising said metal diaphragm, said bridge circuit and said input pressure port.

2. The apparatus of claim 1 wherein said metal diaphragm is welded to said input pressure port.

3. The apparatus of claim 1 wherein said metal diaphragm and said ceramic surface thereof operate over a temperature of range of at least 40° C. to 150° C.

4. The apparatus of claim 1 wherein said ceramic material is molecularly bonded to said metal diaphragm to form said ceramic surface thereof.

5. The apparatus of claim 1 wherein said ceramic surface bonded to said metal diaphragm comprises a ceramic substrate.

6. The apparatus of claim 5 wherein said ceramic substrate bonded to said metal diaphragm provides corrosion protection to said metal diaphragm.

7. The apparatus of claim 1 wherein said bridge circuit comprises a resistor network.

8. The apparatus of claim 1 wherein an electrical circuit is formed from a flex circuit board comprising an ASIC and associated circuitry thereof.

9. The apparatus of claim 8 further comprising EMI circuitry which forms part of said flex circuit.

10. A transducer apparatus, comprising:
    a metal diaphragm molecularly bonded to a ceramic substrate, wherein said metal diaphragm and said ceramic substrate operate over a temperature of range of at least 40° C. to 150° C.
    a bridge circuit bonded to said ceramic substrate of said metal diaphragm to provide corrosion protection to said metal diaphragm;
    EMI circuitry configured on said flex circuit;
    an input pressure port for pressure sensing thereof, wherein said input pressure port is welded to said metal diaphragm to thereby form a transducer apparatus comprising said metal diaphragm, said ceramic substrate said bridge circuit and said input pressure port.

11. A method for forming a transducer, comprising the steps of:
    molecularly bonding a metal diaphragm to a ceramic material to form a ceramic surface thereof;
    connecting a bridge circuit to said ceramic surface of said metal diaphragm; and
    providing an input pressure port for pressure sensing thereof, wherein said input pressure port is connected to said metal diaphragm to thereby form a transducer apparatus comprising said metal diaphragm, said bridge circuit and said input pressure port.

12. The method of claim 11 wherein the step of connecting a bridge circuit to said ceramic surface of said metal diaphragm, further comprises the step of:
    welding said metal diaphragm to said input pressure port.

13. The method of claim 11 wherein said metal diaphragm and said ceramic surface thereof operate over a temperature of range of at least 40° C. to 150° C.

14. The method of claim 11 wherein the step of connecting a bridge circuit to said ceramic surface of said metal diaphragm, further comprises the step of:
    molecularly bonding said ceramic material to said metal diaphragm to form said ceramic surface thereof.

15. The method of claim 11 wherein said ceramic surface bonded to said metal diaphragm comprises a ceramic substrate.

16. The method of claim 15 wherein said ceramic substrate bonded to said metal diaphragm provides corrosion protection to said metal diaphragm.

17. The method of claim 11 wherein said flex circuit comprises an ASIC (Application Specific Integrated Circuit).

18. The method of claim 17 further comprising the step of forming said ASIC from a flex circuit.

19. The method of claim 18 further comprising the steps:
    providing a Z-axis conductor; and
    forming a conductor path from said bridge circuit, through said z-axis conductor into said flex circuit.

20. The method of claim 11 further comprising the step of providing a housing in which said transducer apparatus, including said bridge circuit, said metal diaphragm, said ceramic surface and said input pressure port are located.

* * * * *